Dec. 17, 1946.　　T. P. SIMPSON ET AL　　2,412,917
METHOD FOR CATALYTIC CONVERSION
Filed Sept. 19, 1942　　2 Sheets-Sheet 1
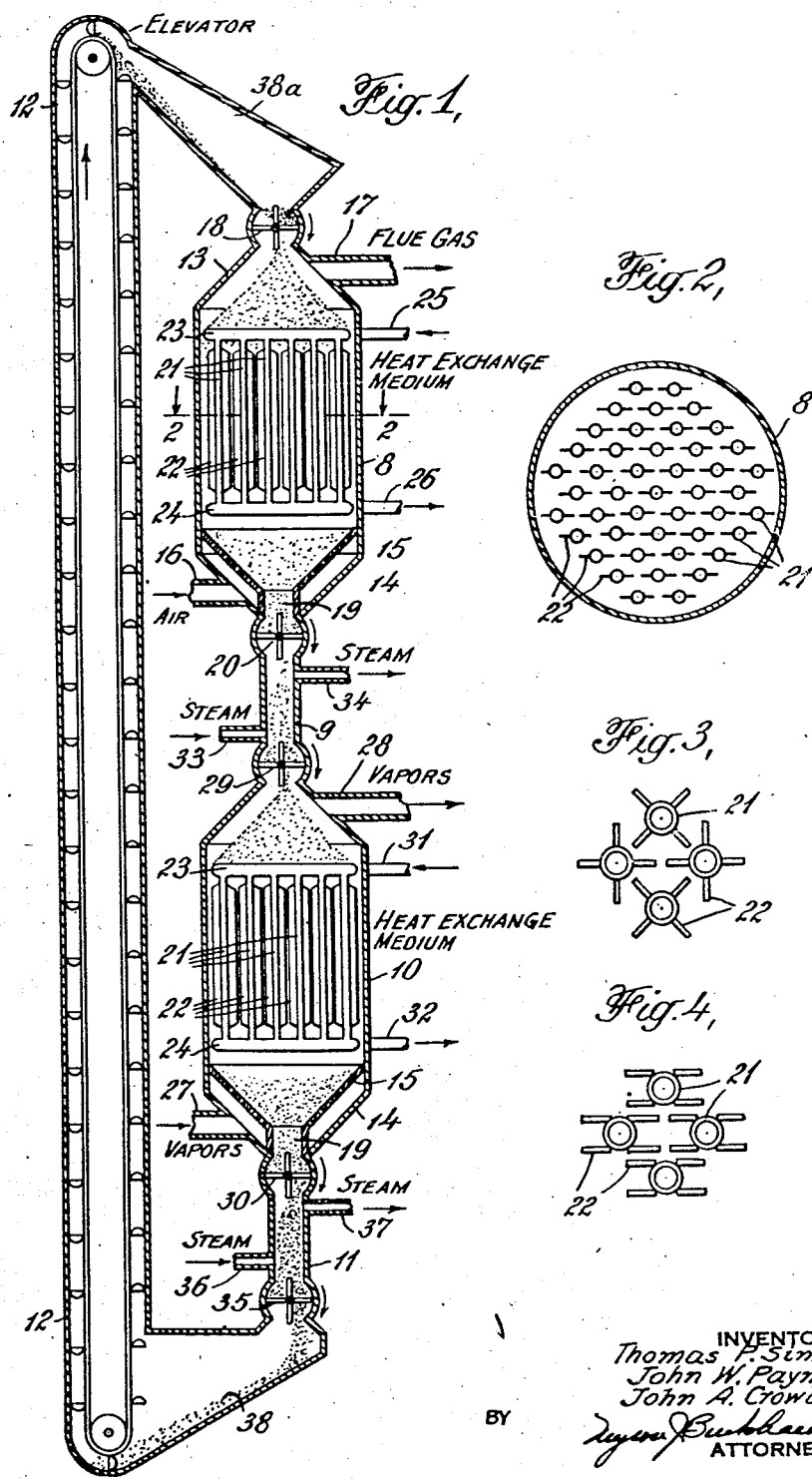

Dec. 17, 1946.  T. P. SIMPSON ET AL  2,412,917
METHOD FOR CATALYTIC CONVERSION
Filed Sept. 19, 1942   2 Sheets-Sheet 2
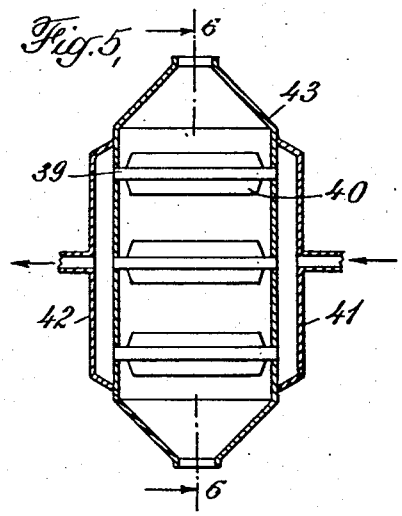
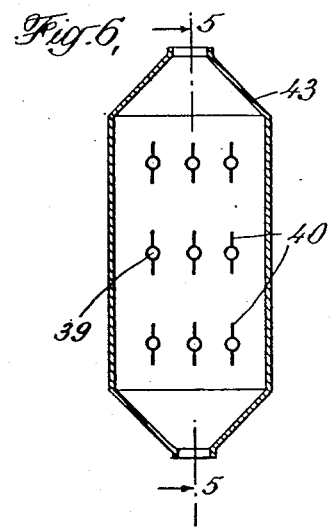
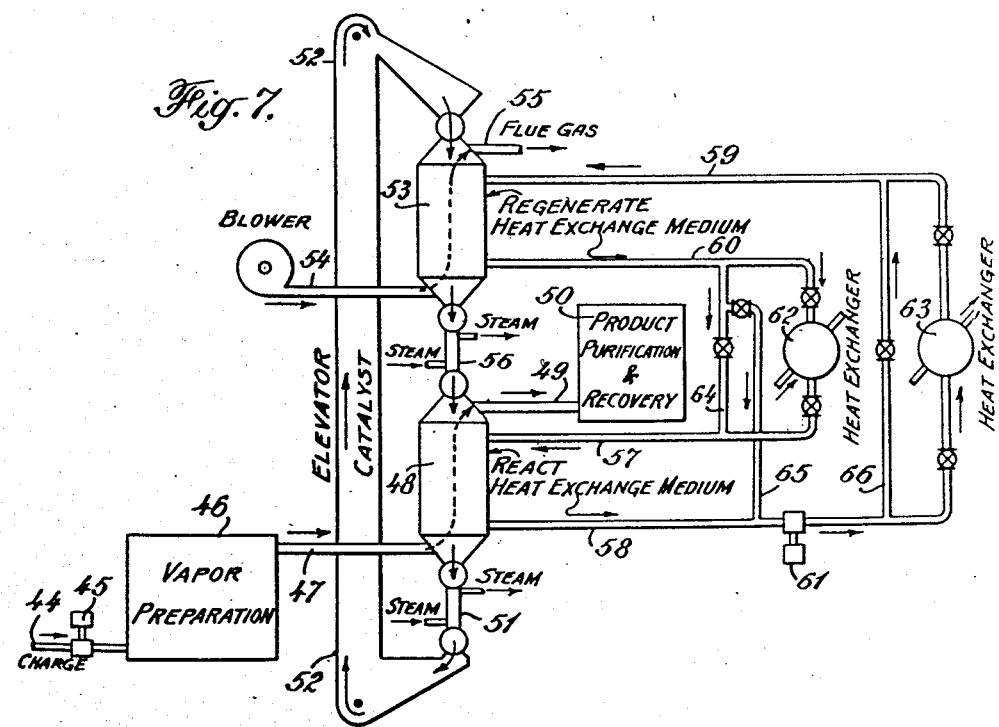
INVENTOR
Thomas P. Simpson,
John W. Payne and
John A. Crowley, Jr.
BY
ATTORNEY Patented Dec. 17, 1946

2,412,917

UNITED STATES PATENT OFFICE 2,412,917

METHOD FOR CATALYTIC CONVERSION

Thomas P. Simpson, John W. Payne, and John A. Crowley, Jr., Woodbury, N. J., assignors to Socony-Vacuum Oil Company, Incorporated, a corporation of New York Application September 19, 1942, Serial No. 458,926

14 Claims. (Cl. 196—52)

1

This invention is directed to methods of conducting reactions in the presence of a contact mass, such as, for example, the catalytic conversion of hydrocarbons.

It is known that many operations for the conversion of hydrocarbon materials to other hydrocarbon materials of differing physical and/or chemical properties may be carried out catalytically. Most of these are carried out by contacting the hydrocarbon, usually in vapor form and at high temperature, with a contact mass composed of particles which themselves have a catalytic effect, or which are impregnated with or act as a support for other catalytic material of a nature appropriate to the result desired. Such operations may contemplate, for example, the conversion of hydrocarbons of high boiling point to those of lower boiling point, or the polymerization of light or gaseous hydrocarbons to hydrocarbons of higher boiling point. Other operations of like nature are catalytic dehydrogenation, hydrogenation, desulphurizing, partial oxidation and similar conversions of hydrocarbon materials. The method of operation herein disclosed is applicable to all such conversions. Of these operations, the vapor phase cracking of heavy hydrocarbons to gasoline is typical, and this specification will hereinafter discuss such operation as exemplary, without, however, intending to be limited thereby or thereto except by such limits as may appear in the claims.

Such catalytic processes generally make use of reaction chambers containing a fixed body of catalyst or contact mass, through which the reaction mixture is passed, and in which, after the reaction has slowed down to an uneconomic point, the contact mass is regenerated in situ. Such processes are not continuous, and only attain continuity by the provision of numerous reaction chambers which are alternately placed on stream and on regeneration. Likewise, it is difficult to maintain constant quantity and quality of product without numerous chambers and intricate scheduling, due to the progressively decreasing activity of catalyst. This same feature, with apparatus limitations, prevents, to a degree, the use of catalyst at a uniform high efficiency level. Most of these difficulties may be avoided by the use of a method wherein the catalyst or contact mass is handled continuously as well. This invention is specifically directed to such a process.

This invention has for its object the provision of a process of hydrocarbon oil conversion wherein a continuously moving stream of hydrocarbon oil is contacted with a continuously moving stream of catalyst for the accomplishment of conversion, in which the catalytic material is used only at a high level of efficiency, and in which the catalytic material is continuously regenerated and returned to the conversion step, both operations being conducted under controlled conditions.

This invention has for a major object the establishment of proper control factors for the efficient operation of such a process.

This invention is based upon the principle of carrying out catalytic reactions by flowing a stream of reaction mixture in physical contact with a flowing stream of catalytic material.

In order that this invention may be understood, reference is made to the drawings attached to and made a part of this specification. In these drawings, Figure 1 shows in diagram form a reaction and regeneration apparatus suitable for use in this process, Figures 2, 3, 4, 5 and 6 are concerned with internal details of such chambers, and Figure 7 shows in diagram form a set-up of apparatus suitable for the conversion of hydrocarbon oils.

In Figure 1, character 8 denotes a regeneration chamber, 9 a purging section, 10 a reaction chamber, 11 a second purging section, and 12 an elevator for catalyst particles. Regeneration chamber 8 and reaction chamber 10 are similar in construction and internal fittings and consist (referring now to 8) of an exterior shell 8, which may be cylindrical or rectangular in cross-section, with a convergent sealed top 13 and a convergent bottom 14, and fitted with an interior false bottom 15, which is perforate, the perforations therein being too small for the passage of catalyst particles but permitting the passage of liquid or gas. Bottom 14 is fitted with pipe 16, and top 13 with pipe 17. At the top of 13 is a sealed feeding device 18, which may be a star wheel as shown, an intermittently operated valve set-up or other common device of this nature. Catalyst material introduced through 18 fills the interior of shell 8, passes down therethrough, is collected by false bottom 15 and chute 19 and is removed by a second intermittently operating device, such as star wheel 20. This arrangement effects a continuously moving stream of catalytic material through shell 8. Reaction mixture, in this case air for an oxidizing regeneration, may be introduced through pipe 16 and products of reaction, in this case flue gas, may be removed through pipe 17. This effects a continuously flowing stream of reaction material in physical contact with the continuously flowing stream of catalytic material in shell 8. The flow shown is countercurrent. If desired, it may be made concurrent by reversing the functions of 16 and 17. Shell 8 is also internally fitted with a series of conduits 21, equipped with fins 22, joined to headers 23 and 24, through which a heat exchange medium may be passed by means of pipes 25 and 26. The heat exchange medium may be used to control the temperature of reaction by extraction of heat from or addition of heat to the material within shell 8, and its flow may be concurrent, countercurrent, or, as later shown, transverse to the direction of flow of catalytic material. Shell 10 is similarly fitted and similarly operated. Reaction material, in this case hydrocarbons, is introduced by 27, and removed by 28, catalyst movement is controlled by 29 and 30, and heat exchange medium is circulated by pipes 31 and 32. Confined passage 9, maintained relatively full of catalyst by devices 20 and 29, is fitted with pipes 33 and 34, by means of which steam may be passed through the catalyst for purging. A similar purging passage 11 lies below shell 10, is controlled by devices 30 and 35, and fitted with steam pipes 36 and 37 for purging catalyst after reaction. From 11 the catalyst drops through 35 into boot 38 of elevator 12 by which it is elevated and discharged into bin 38a above shell 8. Elevator 12 may be of the belt and bucket type shown or of any other kind suitable for the physical properties of the catalytic materials. It will be seen that in apparatus of the type shown in Figure 1 there is a controlled gravity flow of catalyst through shells 8 and 10 into the feed boot 38 of the elevator 12 which returns spent catalyst to the inlet of shell 10, thereby providing means for carrying out the continuous catalytic process contemplated herein with a high degree of thermal efficiency because the hot catalyst does not have an opportunity to cool to atmospheric temperature during its movement through the circuit. Obviously, arrangements other than that described above may be employed to effect the movement of catalyst successively through a conversion chamber and a regenerating chamber without permitting it to cool to atmospheric temperature. Customary devices for the removal of fines and the addition of makeup may be inserted in the catalyst conveyor system. Special attention should be given to the arrangement of heat exchange tubes within the shells 8 and 10. These should be so arranged as to promote the passage of catalytic material and reaction material longitudinally through the shell in such manner that the flowing material is at all times in heat exchange relationship with the heat exchange medium while in the zone of heat exchange elements. It will be seen from Figure 1, regenerator 8, that a zone above and a zone below the heat exchange tubes provide space in which the temperature is independent of control other than temperature of reactants and nature of the reactions taking place. The conduits may be unfinned, but better results are obtained if the external heat transfer surface of the heat exchange tubes is augmented by the addition of fins thereto. These fins, primarily added for heat transfer reasons may be taken advantage of to assist in control of the flow of catalyst and reaction fluid and contact therebetween by being disposed so that they, together with the tubes, divide the space within the shell into a series of longitudinal passages of substantially constant cross-section throughout their length.

In certain reactions, no heat transfer elements are required in the reaction chamber.

Figure 2 shows a cross-section of case 8 at the level 2—2 showing how the preferred longitudinal passages may be formed by equipping each heat exchange tube with two diametrically opposed, longitudinally disposed axial fins. Figures 3 and 4 show other ways of arriving at the same result. The heat transfer tubes need not be arranged parallel to the flow of catalyst, but may well be transverse thereto, as shown in Figures 5 and 6, wherein transverse tubes 39, carrying fins 40, extend between header boxes 41 and 42 in a shell 43, to exercise the same functions as corresponding parts in shells 8 and 10.

It will also be noted in Figures 5 and 6 that the heat exchange elements 39—40 may be spaced apart so as to provide within the regeneration chamber several zones intermediate of its ends, wherein combustion may take place without substantial simultaneous removal of heat.

The heat exchange medium, if used, may be any fluid suitable for the load and temperature levels encountered, such as gases, liquids of various kinds, molten metals, or alloys, or fused salts. Preferably it should be possessed of a low vapor pressure, low viscosity, and high specific heat at operating temperatures and non-corrosive to steel.

Passages 9 and 11, used for purging by passing steam through the catalyst particles, should be so proportioned that a sufficient contact of steam and catalyst particles occurs to remove the residual volatile products of the preceding reaction.

Turning to Figure 7, which shows an operating setup appropriate for a conversion of hydrocarbons, such as, for example, a vapor phase cracking, we find charge oil fed through pipe 44 by pump 45 to a vapor preparation unit 46. Vapor preparation unit 46 will consist essentially of a heater, for which purpose any of the usual forms of heater common in the art, say a pipe still, may be used, to heat and vaporize the charge and heat it to reaction temperature, and, if the charge used is not wholly vaporized at the reaction temperature, a vapor separator to remove unvaporized liquid residue. Vapors from 46 move through pipe 47 into and through reaction chamber 48 (the same as 10, Figure 1), and therein undergo catalytic reaction. Reaction products pass through pipe 49 to product purification and recovery equipment denoted by 50. 50 may be made up of any of the usual fractionation, separation and disposal devices currently in common use for handling products of cracking reactions. If desired, product fractions boiling above the desired low-boiling product may be returned to the system for retreatment, either separately or in admixture with fresh charge. Catalytic material flowing from 48 is purged in 51 and elevated by 52 to be introduced into 53 wherein it is regenerated by burning with air supplied by blower and pipe 54, the products of regeneration being disposed of through pipe 55, after which the regenerated catalyst is purged in 56 and returned to 48. The temperature level of the reaction in 48 may be controlled and latent heat of reaction added thereto by a heat exchange medium introduced through pipe 57 and removed through pipe 58. In the arrangement shown in Figure 7 the same heat exchange medium used in 48 may also be used to control the temperature of regeneration in 53. In the operation described herein, where the regeneration is an exothermic reaction, the function of the heat exchange medium in the intermediate region of chamber 53 is to prevent the temperature of regeneration reaching a point which would cause heat damage to the catalyst and at the same time permitting combustion of the carbonaceous deposit thereon. Thus the heat exchange medium in 53 acts to adjust and maintain the temperature of the moving mass in the intermediate region thereof, between a minimum temperature below which burning of the carbonaceous deposit in the presence of oxidizing gases at an appresiable rate cannot occur and a maximum temperature above which the catalytic material would be damaged by heat. For example, the temperature for regeneration of a spent clay type catalyst used in cracking hydrocarbons may range from around the cracking temperature (from about 800° to about 950° F.) to a peak temperature in the neighborhood of 1050° to 1100° F. Care should be exercised so that the regenerating temperature does not rise substantially above 1200° F. or serious damage to a catalyst of this type may result. In the arrangement shown in Figure 7, the heat exchange medium is introduced into 53 by pipe 59 and removed by pipe 60. The heat exchange medium is circulated by pump 61 and the temperature for the several uses may be controlled by use of various combinations of heat exchangers 62 and 63 and by-passes 64, 65 and 66 in a manner obvious to those skilled in the art. In many cases if the reactions taking place in chamber 48 have a relatively small heat of reaction or where maintenance of closely controlled temperatures is not essential it is unnecessary to circulate the heat transfer medium through the chamber and a satisfactory heat balance and temperatures can be attained by balancing the temperatures of the entering reactants and catalyst.

As an example of one operation successfully conducted in such apparatus, according to the process herein disclosed, coastal gas oil with which was admixed steam to the extent of about $$\frac{10 \text{ oil}}{1 \text{ water}}$$

(cold volumes), at a temperature of 800° F. was contacted with a catalyst of activated clay granules at a rate of one volume of oil (cold) to four volumes of clay in a chamber through which the clay passed at such a rate that it remained in the reaction zone about 20 minutes, with the following results:

Yield of 410° E. P. gasoline (including isobutane and heavier in gas) _vol. per cent__ 67.4
Yield of dry gas (lighter than isobutane)
    wt. per cent__ 4.0
Yield of coke_____wt. per cent__ 2.5
Yield of recycle stock_____vol. per cent__ 35.0

In this run the catalyst was passed through the regeneration chamber (of the same size as the reaction chamber) at the same rate, and was burned with a sufficient volume of air to maintain above 10% $CO_2$ in the exit flue gas.

The temperature of the reaction was held by use of the heat exchange medium at 800° F., and in the same manner the temperature of the regeneration was not allowed to rise above 1100° F.

The gasoline produced was of excellent quality, high in anti-knock rating, and the recycle stock was clean, light in color, and of about the same boiling range as the charge. No high boiling, dirty, liquid cracking tar was produced. The regenerated catalyst was equal in efficiency to new catalyst, no detectable deterioration in quality being found.

The control of several features of the operation is of considerable importance. In both the regenerator and reactor, the particle-form solid catalyst is moved down through the operation in the form of a solid moving column while the reactants (oxidizing gas in one case and hydrocarbons in the other), are passed countercurrently therethrough. In order to effectively secure contact of the reactants with all portions of the contact mass it is necessary that the reactants be passed therethrough at such velocity that the orderly and uniform progress of the contact mass is not impeded, and that channels wherein reactants might pass through rapidly without adequate reaction be prevented from forming. It has been determined that the preferable upper limit for reactant velocity is somewhat below that at which active physical disturbance or "boiling" of the contact mass will occur. Of course, since various reactants may be used, of varying densities and varying viscosities at the temperature of reaction, ranging from air to relatively heavy hydrocarbon, the actual linear velocities will vary for each reactant. Also, for particles of various sizes, the resistance of a given depth of bed is greater in some cases, giving rise to another variation in the actual linear velocity of the reactant. However, it has been determined that all of these variables merge in such a manner that it can be stated that the maximum flow of any reactant, through any particle form solid catalyst of clay type, should not be greater than that which will produce a pressure drop of about 6 inches of water per foot of path through the contact mass, measured between the most nearly adjacent points of inlet and exit.

This limiting value of pressure drop will vary with the apparent density of the contact mass material in the solid moving column. That is, for contact mass materials which have a greater weight per unit of volume in the state of packing they attain in the solid moving column, the optimum pressure drop will be higher. It will, for example, range from somewhat less than 6" of water per foot of path for materials having an apparent density of 0.6 to somewhat less than 11" of water for materials having an apparent density of 1.1. Since fuller's earth, "filtrol," acid-treated natural clays, and most synthetic materials now in use and of this general type have apparent densities ranging from about 0.6 to 0.8 a pressure drop of about 6" to 8" of water per foot of path is optimum for such catalytic materials of clay type. However, other catalytic materials which are also useful will include materials of higher apparent density, such as certain synthetic associations of alumina and silica, or may include materials of the clay-type, or of synthetic origin carrying a sufficient amount of other catalyst, such as certain well known catalytic metals carried by clay type carriers. With these, the upper limits of optimum pressure drop are indicated.

The limits so far discussed are optimum and preferred limits, as will be understood from the following. Obviously, greater economic usefulness results from greater use of each unit of reaction space installed, that is from greater thruput of reactant per cubic foot of installed contact mass volume. Also, particularly in cracking of hydrocarbons, the laydown of carbonaceous matter on the contact mass does not increase proportionately with increases in reactant thruput per unit volume of contact mass. Reaction can, of course, be attained above these preferred limits, up to rates of reactant thruput which are actually disruptive of the contact mass, but we have found that with contact masses of the general nature of clay that the rate should not be greater than one giving 7 to 10 inches of water pressure drop per foot of path through the contact mass and preferably not greater than one giving about 6 to 8 inches of water pressure drop per foot of path through the contact mass.

For the heavier contact mass materials the optimum pressure drop will range upward to about 11 inches of water per foot of path, with the maximum pressure drop ranging upwardly to about 13 inches of water per foot of path.

Of similar interest and importance is the control of burning in the regenerator, particularly in those portions of the regenerator where burning may take place without simultaneous removal of heat. The required temperature limits for combustive regeneration are, as a minimum, the temperature which will support combustion, namely about 750° F. as a practical minimum and 800° F. as a preferred minimum temperature level in regeneration. The maximum is that temperature at which the contact mass will be damaged or reduced in efficiency by heat. As a matter of practical operation, the operating maximum will be about 950° F. to about 1100° F., with 1200° F. set as an operating maximum which should not be exceeded.

In order to attain the control necessary to avoid these maximum temperatures and at the same time assure complete control of carbonaceous deposit, the operation should preferably be varied in accordance with the amount of impurity, usually spoken of as "coke." If the coke to be burned off is large in amount, say above about 3 per cent by weight of the contact mass, the exothermic heat generated by its burning is so great relative to the heat capacity of the catalyst and combustion gases that a generally simultaneous burning and removal of heat is advantageous. If the coke to be removed is below about 3 per cent and particularly if it is below 1 per cent by weight of the contact mass, a considerably better burn off or regeneration may be obtained by permitting periods of burning without substantial simultaneous removal of heat in order to permit of more cleanly removing difficultly ignitable coke. These conditions of relatively small coke burnoff are typical of the regeneration of contact mass material spent in cracking, and for this reason, when working with such a process it is preferred to use a regenerator equipped as shown in Figures 5 and 6 where regions of burning without substantial simultaneous removal of heat are alternated with heat removal regions. However, control of maximum temperature is necessary in these combustion regions without heat removal means and this can be provided by so adjusting the intensity of combustion in these regions as to provide a burn-off which is not sufficient in intensity to raise the contact mass therein to damaging temperature levels. It has been found that burning off up to about 0.6 per cent by weight of coke (based upon contact mass), in each stage of burning without substantial heat removal will achieve good regeneration and permit adequate protection of the contact mass material. Dependent upon the usual variables of combustion control, these results may be obtained to an operable degree by burning off, in each such combustive regeneration stage without substantial removal of heat, from about 0.05 per cent to about 0.60 per cent by weight of coke, based on contact mass weight.

The controls herein set forth cooperate to permit the establishment of a highly useful cyclic commercial process. The control set forth for the conversion reaction accomplishes high rates of converted product production per unit of catalyst volume employed, while at the same time permitting relatively low rates of coke deposition. For this optimum conversion operation, it is highly desirable to provide a catalytic contact mass of controlled activity. The regeneration control set forth permits of attaining such controlled regeneration of spent catalysts in proportion to the amount of coke deposited thereon.

It is to be understood that the specific examples and numerical data herein disclosed are explanatory of the invention, and that it is not to be limited thereby or thereto except as such limitations are expressed in the claims.

This application is a continuation-in-part of our copending application Serial No. 361,440, filed October 16, 1940, which, in turn, is a continuation-in-part of our application Serial No. 162,541, filed September 4, 1937.

We claim:

1. The method of converting a hydrocarbon oil which comprises passing the oil in vapor phase and at conversion temperature into contact with a substantially compact downwardly moving mass of particle-form, clay-type, solid catalytic material in which conversion is effected, the vapors being introduced thereto at a flow rate not in excess of sufficient to produce about seven to ten inches of water pressure drop per foot of vapor path through said mass, effecting substantially complete separation of hydrocarbons from said mass, transferring contaminated contact mass to a regeneration zone and moving it therethrough as a substantially compact moving mass, supplying oxygen containing gas thereto to burn contaminant therefrom and removing heat sufficient to prevent the temperature of regenerating contact mass from rising above that which will damage the contact mass, and returning the regenerated contact mass in heated condition to the conversion zone.

2. The method of converting a hydrocarbon oil which comprises passing the oil in vapor phase and at conversion temperature into contact with a substantially compact, upright column of gravitating particle-form, clay-type, solid catalytic material in which conversion is effected, the vapors being introduced thereto at a flow rate not in excess of sufficient to produce about six to eight inches of water pressure drop per foot of vapor path through said column, effecting substantially complete separation of hydrocarbons from said column, transferring contaminated catalytic material to a regeneration zone and moving it therethrough as a substantially compact column of moving particles, supplying oxygen containing gas thereto to burn contaminant therefrom and positively removing heat sufficient to prevent the temperature of regenerating catalytic material from rising above that which will damage the catalytic material, and returning the regenerated contact mass in heated condition to the conversion zone.

3. The method of converting a hydrocarbon oil which comprises passing the oil in vapor phase and at conversion temperature into contact with a substantially compact moving mass of gravitating particle-form, clay-type, solid catalytic material in which conversion is effected, the vapors being introduced thereto at a flow rate substantially below that which causes physical disturbance of the moving mass, effecting substantially complete separation of hydrocarbons from said mass, transferring contaminated contact mass to a regeneration zone and moving it therethrough as a substantially compact downwardly moving mass, supplying oxygen containing gas thereto to burn contaminant therefrom, said gas being supplied at a flow rate not in excess of sufficient to produce about seven to ten inches of water pressure drop per foot of gas path through said mass, and removing heat sufficient to prevent the temperature of regenerating contact mass from rising above that which will damage the contact mass, and returning the regenerated contact mass in heated condition to the conversion zone.

4. The method of converting a hydrocarbon oil which comprises passing the oil in vapor phase and at conversion temperature into contact with a substantially compact downwardly moving mass of particle-form solid catalytic material of clay type in which conversion is effected, the vapors being introduced thereto at a flow rate substantially below that which causes physical disturbance of the moving mass, effecting substantially complete separation of hydrocarbons from said mass, transferring contaminated contact mass to a regeneration zone and moving it downwardly therethrough as a substantially compact moving mass, supplying oxygen containing gas thereto to burn contaminant therefrom, said gas being supplied at a flow rate not in excess of sufficient to produce about six to eight inches of water pressure drop per foot of gas path through said mass, while removing heat sufficient to prevent the temperature of regenerating contact mass from rising above that which will damage the contact mass, and returning the regenerated contact mass in heated condition to the conversion zone.

5. The method of converting a hydrocarbon oil which comprises passing the oil in vapor phase and at conversion temperature into contact with a substantially compact moving mass of gravitating particle-form solid catalytic material of clay type in which conversion is effected, the vapors being introduced thereto at a flow rate substantially below that which causes turbulence of the moving mass, effecting substantially complete separation of hydrocarbons from said mass, transferring contaminated contact mass to a regeneration zone and moving it therethrough as a substantially compact downwardly moving mass, supplying oxygen containing gas thereto to burn contaminant therefrom, said gas being supplied at a flow rate substantially below that which causes turbulence of the moving mass, and removing heat sufficient to prevent the temperature of regenerating contact mass from rising above that which will damage the contact mass, and returning the regenerated contact mass in heated condition to the conversion zone, the flow rate of vapors in the conversion section and of gas in the regenerator both being limited to an amount giving not in excess of about six to eight inches of water pressure drop per foot of path of vapor or gas through said mass.

6. The method of regenerating a particle form solid, clay type, catalytic material contaminated by a carbonaceous deposit which comprises continuously passing said material as a substantially compact column through a plurality of zones in which combustion occurs without substantial simultaneous removal of heat, said combustion zones alternating with cooling zones in which heat is removed by indirect heat exchange with a fluid heat exchange medium, the temperature at all times being maintained between a minimum temperature at which combustion will take place and a maximum temperature at which the catalytic material begins to suffer heat damage, the amount of burning in each combustion zone being limited to the burning off of from 0.05 per cent to about 0.60 per cent by weight of carbonaceous material based on catalytic material weight.

7. The method of regenerating a particle form solid, clay-type, catalytic material contaminated by a carbonaceous deposit which comprises continuously passing said material as a substantially compact column through a plurality of zones in which combustion occurs without substantial simultaneous removal of heat, said combustion zones alternating with cooling zones in which heat is removed by indirect heat exchange with a fluid heat exchange medium, the temperature at all times being maintained between a minimum temperature at which combustion will take place and a maximum temperature at which the catalytic material begins to suffer heat damage, the amount of burning in each combustion zone being limited to the burning off of 0.60 per cent by weight of carbonaceous material based on catalytic material weight.

8. The method of regenerating a particle form clay type solid adsorbent material contaminated by a carbonaceous deposit which comprises continuously passing said material as a substantially compact column through a plurality of zones in which combustion occurs without substantial simultaneous removal of heat, said combustion zones alternating with cooling zones in which heat is removed by indirect heat exchange with a fluid heat exchange medium, the temperature at all times being maintained between a minimum temperature at which combustion will take place and a maximum temperature at which the adsorbent material begins to suffer heat damage, the amount of burning in each combustion zone being limited to the burning off of from about 0.05 per cent to about 0.60 per cent by weight of carbonaceous material based on adsorbent material weight and the flow rate of regeneration gases therethrough being not over sufficient to produce a pressure drop of about seven to ten inches of water per foot of gas path through said material.

9. The method of regenerating a particle form clay type solid adsorbent material contaminated by a carbonaceous deposit which comprises continuously passing said material as a substantially compact column through a plurality of zones in which combustion occurs without substantial simultaneous removal of heat, said combustion zones alternating with cooling zones in which heat is removed by indirect heat exchange with a fluid heat exchange medium, the temperature at all times being maintained between a minimum temperature at which combustion will take place and a maximum temperature at which the adsorbent material begins to suffer heat damage, the amount of burning in each combustion zone being limited to the burning off of 0.60 per cent by weight of carbonaceous material based on adsorbent material weight and the flow rate of regeneration gases therethrough being not over sufficient to produce a pressure drop of six to eight inches of water per foot of gas path through said material.

10. The method of converting a hydrocarbon oil which comprises passing the oil in vapor phase and at conversion temperature into contact with a substantially compact moving mass of particle-form solid clay-type catalytic material in which conversion is effected, the vapors being introduced thereto at a flow rate substantially below that which causes turbulence of the moving mass, effecting substantially complete separation of hydrocarbons from said mass, transferring contaminated contact mass to a regeneration zone, supplying oxygen containing gas thereto to burn contaminant therefrom, said burning being accomplished by passing said material as a substantially compact column through a plurality of zones in which combustion occurs without substantial simultaneous removal of heat, said combustion zones alternating with cooling zones in which heat is removed by indirect heat exchange with a fluid heat exchange medium, the temperature at all times being maintained between a minimum temperature at which combustion will take place and a maximum temperature at which the catalytic material begins to suffer heat damage, the amount of burning in each combustion zone being limited to the burning off of from about 0.05 per cent to about 0.60 per cent by weight of carbonaceous material based on catalytic material weight and returning the regenerated catalytic material in heated condition into contact with oil vapor.

11. The method of converting a hydrocarbon oil which comprises passing the oil in vapor phase and at conversion temperature into contact with a substantially compact moving mass of particle-form solid clay-type catalytic material in which conversion is effected, the vapors being introduced thereto at a flow rate substantially below that which causes turbulence of the moving mass, effecting substantially complete separation of hydrocarbons from said mass, transferring contaminated contact mass to a regeneration zone, supplying oxygen containing gas thereto to burn contaminant therefrom, said burning being accomplished by passing said material as a substantially compact column through a plurality of zones in which combustion occurs without substantial simultaneous removal of heat, said combustion zones alternating with cooling zones in which heat is removed by indirect heat exchange with a fluid heat exchange medium, the temperature at all times being maintained between a minimum temperature at which combustion will take place and a maximum temperature at which the catalytic material begins to suffer heat damage, the amount of burning in each combustion zone being limited to the burning off of 0.60 per cent by weight of carbonaceous material based on catalytic material weight and returning the regenerated contact mass in heated condition into contact with oil vapor.

12. A unitary process for conversion of heavy hydrocarbons to lighter hydrocarbons in the presence of a catalytic contact mass of particle form, clay type, solid adsorptive material comprising the steps of flowing the contact mass material as a substantially compact moving column through a reaction zone, flowing a stream of hydrocarbons heated to conversion temperatures therethrough at a high flow rate conducive to relatively low deposits of contaminant on catalyst relative to converted products made per unit volume of catalyst employed and still at an amount not sufficient to produce a pressure drop in excess of about seven to ten inches of water per foot of path of vapors through said material, flowing the relatively low contaminant content contact mass material therefrom into and through a regeneration zone in which said material flows as a substantially compact moving column and is maintained at all times at a temperature high enough to support combustion and below a temperature high enough to effect heat damage to said material, burning contaminant from said material in a plurality of regenerative steps in each of which no more than about 0.05 per cent to 0.60 per cent by weight of contaminant, based on contact mass weight, is removed from said material and in each of which no substantial removal of heat is effected, between said burning zones removing heat from said material by indirect heat exchange with a fluid heat exchange medium, the flow rate of regeneration gases being high to effect good penetration of said material but not sufficient to produce a pressure drop in excess of about seven to ten inches of water per foot of path of gas through said material and returning the regenerated contact mass in heated condition to the reaction zone.

13. A unitary process for conversion of heavy hydrocarbons to lighter hydrocarbons in the presence of a catalytic contact mass of particle form, clay type, solid adsorptive material comprising the steps of flowing the contact mass material as a substantially compact moving column through a reaction zone, flowing a stream of hydrocarbons heated to conversion temperatures therethrough at a high flow rate conducive to relatively low deposits of contaminant on catalyst relative to converted products made per unit volume of catalyst employed and still at an amount not sufficient to produce a pressure drop in excess of about six to eight inches of water per foot of path of vapors through said material, flowing the relatively low contaminant content contact mass material therefrom into and through a regeneration zone in which said material flows as a substantially compact moving column and is maintained at all times at a temperature high enough to support combustion and below a temperature high enough to effect heat damage to said material, burning contaminant from said material in a plurality of regenerative steps in each of which no more than 0.60 per cent by weight of contaminant, based on contact mass weight, is removed from said material and in each of which no substantial removal of heat is effected, between said burning zones removing heat from said material by indirect heat exchange with a fluid heat exchange medium, the flow rate of regeneration gases being high to effect good penetration of said material but not sufficient to produce a pressure drop in excess of about six to eight inches of water per foot of path of gas through said material and returning the regenerated contact mass in heated condition to the reaction zone.

14. The method of converting a hydrocarbon oil which comprises passing the oil in vapor phase and at conversion temperature into contact with a substantially compact moving mass of downwardly flowing particle-form solid clay-type catalytic material in which conversion is effected, the vapors being introduced thereto at a flow rate substantially below that which causes physical disturbance of the moving mass, the flow rate being such as to give a pressure drop of not over seven to thirteen inches of water per foot of path of vapor through contact mass for contact mass materials of apparent densities in the reactor ranging from about 0.6 to about 1.1, the pressure drop, within the indicated range being proportional to the said apparent density, effecting substantially complete separation of hydrocarbons from said mass, transferring contaminated contact mass to a regeneration zone and moving it therethrough as a substantially compact moving mass, supplying oxygen containing gas thereto to burn contaminant therefrom and returning the regenerated contact mass in heated condition to the conversion zone.

THOMAS P. SIMPSON.
JOHN W. PAYNE.
JOHN A. CROWLEY, Jr.